United States Patent
Tsai

(10) Patent No.: US 7,697,834 B1
(45) Date of Patent: Apr. 13, 2010

(54) HIDDEN AUTOFOCUS

(75) Inventor: Richard Tsai, Arcadia, CA (US)

(73) Assignee: Siimpel Corporation, Arcadia, CA (US)

(*) Notice: Subject to any disclaimer, the term of this patent is extended or adjusted under 35 U.S.C. 154(b) by 778 days.

(21) Appl. No.: 11/549,381

(22) Filed: Oct. 13, 2006

(51) Int. Cl.
- G03B 13/00 (2006.01)
- G03B 13/30 (2006.01)
- G03B 17/00 (2006.01)
- G02B 7/04 (2006.01)

(52) U.S. Cl. .................. 396/147; 396/77; 396/79; 396/84; 348/345; 250/201.2

(58) Field of Classification Search ............ 396/147
See application file for complete search history.

(56) References Cited

U.S. PATENT DOCUMENTS

| | | | |
|---|---|---|---|
| 5,819,120 A | * | 10/1998 | Hamada et al. ............ 396/77 |
| 5,839,003 A | * | 11/1998 | Iwane ...................... 396/102 |
| 2004/0052514 A1 | * | 3/2004 | Hirai ........................ 396/89 |
| 2004/0070679 A1 | * | 4/2004 | Pope ................... 348/231.99 |
| 2005/0023435 A1 | * | 2/2005 | Yasuda ................. 250/201.2 |
| 2007/0216796 A1 | * | 9/2007 | Lenel et al. ............. 348/345 |

* cited by examiner

*Primary Examiner*—Melissa J Koval
(74) *Attorney, Agent, or Firm*—Haynes and Boone, LLP

(57) ABSTRACT

In a method and system for focusing a camera focus can be repeatedly alternated between an original focus position and a plurality of other focus positions. An image can be displayed when the focus position is the original focus position. The image can be suppressed at other focus positions when the images are out of focus. The image can be displayed at one of the other focus position when the image is in focus. In this manner, the display of annoying and distracting unfocused images is mitigated.

23 Claims, 3 Drawing Sheets

HIDDEN AUTOFOCUS

TECHNICAL FIELD

The present invention relates generally to cameras. The present invention relates more particularly to an autofocus system for a camera wherein focusing is performed in the background so as to mitigate the undesirable viewing of unfocused images by a user and so as to facilitate the use of generally continuous autofocusing.

BACKGROUND

Autofocus mechanisms for cameras are well known. Such autofocus mechanisms typically move one or more lenses of a camera so as to achieve desired sharpness or focus of an image. Autofocus mechanisms can be either active or passive. Active autofocus mechanisms determine a distance to the subject and then move one or more lenses to a position that has been determined to provide proper focus for that distance. Passive autofocus mechanisms determine the sharpness of images as the focusing lens(es) are moved, so as to determine the particular position where the best focus is obtained.

The distance to the subject can be determined by measuring the time that it takes for a signal, such as infrared light or ultra high frequency sound, to travel to the subject then and bounce back to the camera. Triangulation or the amount of light reflected by a scene can also be used to determine distance.

Sharpness of the image can be determined by computer analysis. The lens or lenses are moved while the computer measures the sharpness of each image produced during the movement. The sharpest image can be considered to be the best focused imaged.

To determine sharpness, the computer can look at the difference in intensity between adjacent pixels of an imaging sensor. This can be the same imaging sensor that is used for taking a photograph or can be a different imaging sensor. The frame that provides maximum intensity difference, at least for some portion of the image, is considered to be the best focus.

With either active or passive focusing, a selected portion of the image can be used to determine focus. For example, when a person is being photographed, the person is generally centered in the image. Thus, using the central portion of the image tends to result in the most desirable focus.

Although such autofocus mechanisms have proven generally suitable for their intended purpose, they do possess inherent deficiencies that tend to detract from their overall desirability. For example, contemporary digital autofocus cameras display each frame or image as the autofocus mechanism searches for the best focus. Thus, contemporary digital autofocus cameras typically display a number of unfocused images before displaying the final focused image. During the focusing process, the focus is constantly changing and an image can go in and out of focus several times as the autofocus mechanism attempts to determine the best focus.

Displaying such a series of images having constantly changing focus is undesirable. More particularly, displaying a scene while the focus is changing can be annoying and distracting. The distraction may even cause a user to miss the desired timing of a shot, particularly for a moving subject.

In view of the foregoing, it is desirable to provide a digital autofocus camera that does not display the images associated with the process used by the autofocus mechanism to determine the best focus while maintaining the video stream.

BRIEF SUMMARY

Methods and systems for varying one or more parameters of a camera are disclosed. More particularly, a method for varying parameters of a camera so as to enhance the display of images thereby can comprise repeatedly alternating the parameter(s) between an original value and a plurality of other values while a new value for each parameter is being determined, displaying an image when the parameter(s) have the original value, not displaying images when the parameter(s) have other values which have not been determined to be best values, and displaying an image when the parameter(s) have values which has best determined to be the best values. For example, the parameter can be focus, white balance, exposure time, and aperture.

According to one or more embodiments of the present invention, methods and systems are disclosed herein to provide enhanced autofocus. More particularly, according to an exemplary embodiment the present invention can comprise a method for focusing a camera wherein the method can comprise displaying a focused image of an original or first scene using a first focus position (a first position of the focusing element, which is generally a lens or lens assembly). Then, after aiming the camera toward another scene, i.e., a second scene, images of the second scene are displayed while still using the first focus position (which might not provide the best focus for the second scene, thus necessitating the need to determine the best focus therefore).

As the second scene is being displayed (using the original or first focus position), an autofocus mechanism determines a second focus position by moving the lens(es). The second focus position is a position of the lens(es) that provides an appropriate focus for the second scene. The autofocus mechanism tests a plurality of different focus positions and then determines (optionally using prediction calculations) a best one of the corresponding plurality of different focuses to be the second focus. Any desired criteria can be used to determine which focus is the best one. The image of the second scene is then displayed using the second focus position.

Of the plurality of different focus positions where focus is being tested, only the image associated with the best focus position is displayed. The images associated with the other (not the best) focus positions are suppressed and not displayed. In this manner, the user sees only a single out of focus image of the second scene and then sees the second scene with the best focus. The user does not see the second scene in a plurality of different unfocused conditions and does not see the second scene go in and out of focus as the autofocus mechanism looks for the best focus.

Thus, not all of the frames or images produced during the autofocusing process are displayed. Some of the frames, which are generally frames that are out of focus, are hidden from view by the user so as to provide a better display of the scene being imaged. However, the use of a rapidly moving, low or no hysteresis actuator facilitates the realtime display of the second scene using the first focus in a manner that provides a continuous display of the second scene while hiding the frames associated with the autofocus testing process.

For example, focus can be repeatedly alternated between an original focus position (that was determined for the original or first scene) and a plurality of other focus positions (at which the autofocus mechanism is testing for best focus). An image can be displayed when the focus position is the original focus position. The images can be not displayed at other focus positions (positions where the autofocus mechanism is testing for best focus) when the images are out of focus. However, images can be displayed at another focus position (a selected one of the focus positions at which the autofocus mechanism tested for best focus—this selected one being the one determined by the autofocus mechanism to be the best focus) when the images are in focus. The best focus position is that focus position that is determined to provide the best focus, using any desired criteria.

The original focus position is a best focus position for the first scene. It may or may not be a best focus position for the second scene. The other focus positions can be positions in which the autofocus mechanism is testing focus (to determine a best focus position) for a second scene. Repeatedly alternating focus between the original focus position and a plurality of other focus positions can comprise repeatedly focusing at the original focus position for one frame and focusing at another focus position for one frame. Testing can be performed at a series of other focus positions that are different from one another, until a best focus is found. The best focus may be found by testing or via the use of a prediction calculation, such as a prediction calculation that uses linear or another type of regression.

Because its operation is at least partially hidden, the autofocus mechanism can be triggered or actuated frequently or even generally continuously. In this manner, the camera is substantially more likely to always or almost always be in focus. This can be accomplished either with or without the use of a sharpness change detector that senses the need for refocusing.

Repeatedly alternating focus between an original position and a plurality of other positions can comprise moving at least one lens. Thus, a lens or a lens assembly (which comprises a plurality of lenses) can be used to effect focus. Alternatively, focus can be effect by moving the imager or another optical element (such as a mirror).

Repeatedly alternating focus between an original position and a plurality of other positions can comprise using a mechanism with substantially no hysteresis to effect focusing. Such a mechanism can be a micro-electromechanical system (MEMS) mechanism. Thus, for example, the actuator used to move a lens assembly for focusing can be a thermal or electrostatic MEMS actuator.

Displaying an image can comprise displaying the image on a display of the camera. Alternatively, displaying the image can comprise displaying the image on any other display. For example, the image can be displayed on a monitor that is electrically connected to the camera.

The focus can be determined by a passive autofocus mechanism. That is, the best focus can be determined by using a processor, such as a computer and/or a digital signal processor (DSP), to determine which one of a series of images (corresponding to a series of focuses or positions of a lens assembly) provided by an imager (such as a CCD or CMOS imager) is the sharpest. The sharpest image, or the image having some portion thereof which is the sharpest, can be determined to the image resulting from the best focus. For example, the image having the sharpest central portion thereof can be determined to be the image having the best focus. As those skilled in the art will appreciate, there can be a variety of different methods to determine the best focus. Any such method can be used according to one or more embodiments of the present invention.

According to an exemplary embodiment, the present invention can comprise an autofocus mechanism for a camera, wherein the autofocus mechanism comprises an imager, an optical element for focusing an image upon the imager, an actuator for moving the optical element, a position controller for controlling movement of the actuator, and an autofocus circuit for determining when an image is in focus.

The optical element, the actuator, the position controller, and the autofocus circuit can cooperate to repeatedly alternate focus between an original position and a plurality of other positions. The autofocus circuit can facilitate displaying an image when the optical element is at the original position. The autofocus circuit can facilitate not displaying an image when the optical element is at other positions and the image is out of focus. The autofocus circuit facilitates displaying an image when the optical element is in a new position and the image is in focus.

The autofocus circuit can provide a display enable signal to facilitate displaying an image. Thus, when the display enable signal is not provided, then display of an image can be suppressed, for example.

The imager, the optical element, the actuator, the position controller, and the autofocus circuit can be configured to be used in a personal electronic device, such as a laptop computer, a pocket PC, a palmtop computer, or a cellular telephone. The imager, the optical element, the actuator, the position controller, and the autofocus circuit can be configured for standalone use, e.g., use in a camera or camcorder that is not part of a personal electronic device.

Thus, according to one or more embodiments of the present invention a digital autofocus camera that does not display images associated with the process of determining the best focus is provided. In this manner, the annoyance and distraction associated with viewing such images is substantially mitigated.

This invention will be more fully understood in conjunction with the following detailed description taken together with the following drawings.

BRIEF DESCRIPTION OF THE DRAWINGS

FIG. 7, is a diagram showing a personal electronic device, such as a cellular telephone, of which a camera configured to perform hidden autofocus according to an exemplary embodiment of the present invention is a part.

Embodiments of the present invention and their advantages are best understood by referring to the detailed description that follows. It should be appreciated that like reference numerals are used to identify like elements illustrated in one or more of the figures.

DETAILED DESCRIPTION OF THE INVENTION

Figure 1:
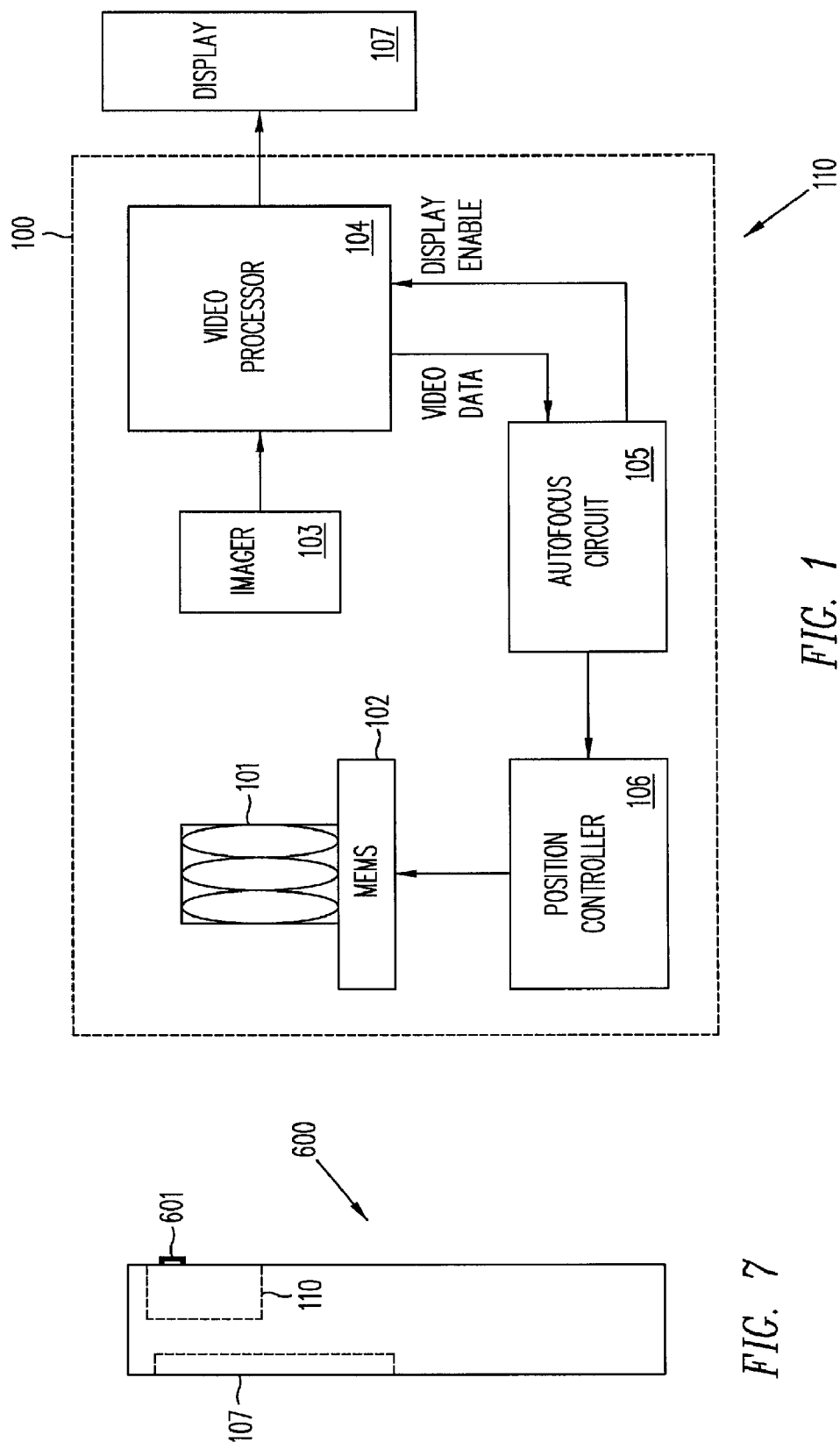
FIG. 1 is a semi-schematic block diagram showing an autofocus mechanism configured to hide unfocused frames or images according to an exemplary embodiment of the present invention.

According to an exemplary embodiment of the present invention, methods and systems are provided for enhancing the display of a camera for a personal electronic device, such as a cellular telephone. According to one or more embodiments of the present invention, camera parameters can be alternated between an original value and other values while the camera is only displaying an image using the original value and while testing for best value of the parameter using the other values. For example, the camera's display of image can be enhanced by determining focus of images in this manner.

While the camera is testing parameters, it can be gathering data and performing analysis that facilitate the selection of the next parameter to be tested. For example, while an autofocus circuit is testing a plurality of different positions of a lens assembly for best focus, it can be collecting information on sharpness at each position and using this information to determine a likely candidate position to test next. More particularly, a formula, such as a linear regression of positions versus sharpness at each position, can be used to facilitate the determination of a lens assembly position that is likely to provide enhance focus with respect to previously tested position. In this manner, positions (potentially many positions) that would otherwise have to be test can be skipped, thus reducing the number of positions and the amount of time required to determine the best position.

The frame rate of the camera can optionally be reduced so as to facilitate processing and/or mechanical movement (such as of a lens assembly) while testing for best value of a parameter. For example, the frame rate can be reduced from 30 frames per second to 15 frames per second when testing for best focus to accommodate movement of a lens assembly, as discussed below.

As used herein, the term position can refer to a location of an optical element of an autofocus mechanism. Different positions of the optical element can provide focus at different distances from the camera to the scene being imaged. For example, one position may provide focus at four feet from the camera while another position may provide focus at thirty feet from the camera. As discussed in further detail below, a best position is a position where a desirable, e.g. best, focus is provided.

The optical element can be a lens or lens assembly. The optical element can be an imager. The optical element can be something other than a lens, lens assembly, or imager, e.g., the optical element can be a mirror. The optical element can be any desired combination of devices.

The best focus can be any focus that provides or is intended to provide a desired image. As those skilled in the art will appreciate, there are many ways to determine when an image is considered to be in focus, e.g., a best focus. Generally, not all portions of an image will be equally in focus. The determination of what portion or portions of an image are used to determine focus can vary from camera to camera and from user to user (such as when this parameter is user selectable). Therefore, best focus can be any focus that is considered acceptable by a user using any desired criteria. The best position is the position of the optical element that corresponds to the best focus.

Referring now to FIG. 1, a camera 110 comprises an autofocus mechanism 100 and a display 107. Autofocus mechanism 100 can comprise a single lens or a lens assembly 101 that is mounted upon a movable stage of an actuator, such as a MEMS actuator 102. Movement of lens assembly 101 by MEMS actuator 102 can effect focusing of an image.

When focus positions are discussed herein, they can refer to positions of lens assembly 101, for example. Different positions of lens assembly 101 provide different focuses, e.g., focuses for different distances to a subject being imaged. A best position of lens assembly 101 can correspond to a best focus for a subject at a particular distance from the camera.

More particularly, lens assembly 101 can focus an image upon sensor or imager 103, such as a CCD imager or a CMOS imager. The output of imager 103 can be processed by video processor 104 so as to provide a signal suitable for displaying the image upon display 107.

Video processor 104 can provide a signal to autofocus circuit 105. Autofocus circuit 105 can perform analysis upon the signal so as to determine the focus, i.e., if the frame or image is out of focus or in focus. Video processor 104 can determine the quality of focus, such as by determining the sharpness, of an image so as to facilitate determination of the best focus. Any desired algorithm or method can be used to determine the best focus. Any desired portion or portions of the image can be used to determine the best focus.

Autofocus circuit 105 can provide a signal, such as a display enable signal, to video process 104 when lens assembly 101 is at a best focus position thereof. This signal can be used to inhibit the display of an image by display 107 when the autofocus mechanism 100 is testing a new position of lens assembly 101 in order to find a new best focus.

Autofocus circuit 105 can provide a signal to position controller 106. The signal can cause position controller 106 to vary the position of an optical element (so as to vary the focus), when the image is not in focus and can cause position controller to maintain the position of the optical element (so as to maintain the focus) when the image is in focus.

Position controller 106 can cause MEMS actuator 102 to move lens assembly 101 in a manner that facilitates determination of the position required for an image to be in focus, e.g., the best focus. For example, position controller 106 can cause MEMS actuator 102 to move lens assembly 101 in a series of steps along its path of travel so that the position corresponding to best focus, e.g., sharpest image or portion thereof, can be determined.

MEMS actuator 102 can be formed with conventional MEMS fabrication techniques. For example, MEMS actuator 102 can comprises an electrostatic comb drive, a thermal expansion drive, or any other type of actuator. MEMS actuator 102 and lens assembly 101 can be very small and very light, especially when compared to non-MEMS actuators and contemporary lens assemblies. MEMS actuator 102 can move lens assembly 101 very fast, especially when compared to the speed with which lens assemblies in contemporary cameras move. MEMS actuator 102 can substantially lack hysteresis.

Moreover, MEMS actuator 102 can move rapidly between a position of focus for a previous scene and a new position where focus is being tested and can do this repeatedly without causing the displayed image to be substantially degraded, e.g., be jerky. Therefore, MEMS actuator 102 can move lens 101 precisely, repeatedly, and quickly. Because lens 101 can be moved precisely, repeatedly, and quickly, the method for hiding unfocused frames described herein is readily facilitated.

Components of autofocus mechanism 100 can perform functions other than autofocus. For example, lens assembly 101, imager 103, and video processor 104 can provide an image for display 107, for storage, and/or for transmission (such as to another cellular telephone.

The camera can contain other components, such as a memory for storing images and a processor for compressing images. The lens assembly can contain lenses that perform functions other than autofocusing. For example, lenses that facilitate zoom and/or macro functionality can be included.

Figure 2:
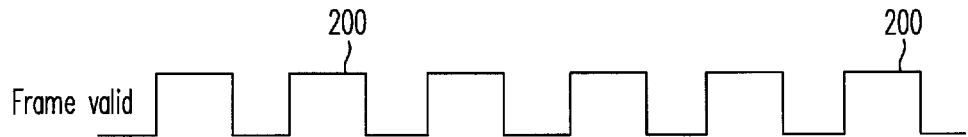
FIG. 2 is a diagram showing a series of frames that are displayed according to contemporary practice.

Referring now to FIG. 2, a series of displayed frames are represented by pulses 200. Each pulse 200 represents an individual frame or image that is displayed. Each frame can correspond to a position of a lens assembly of an autofocus mechanism. No particular positions of the lens assembly are indicated in FIG. 2 (each pulse can represent a different position, all pulses can represent the same position, or any combination of the same and different positions can be considered represented). According to contemporary practice, all of the valid frames are displayed. Pulses to the left are earlier in time that pulses to the right.

Figure 3:
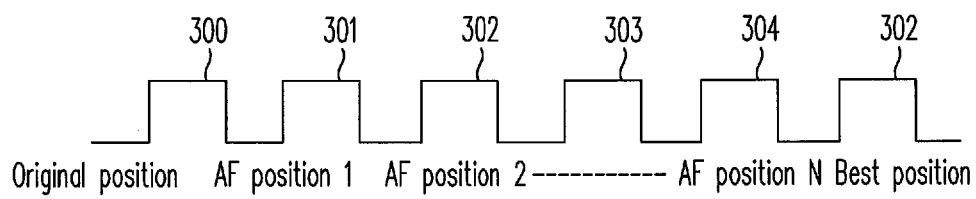
FIG. 3 is a diagram showing a series of frames that are displayed according to contemporary autofocus practice, wherein the first frame is a focused frame of an image taken at a original focus position, the second and most of the subsequent frames are unfocused frames taken at subsequent focus positions, and the last frame is taken at the final, e.g. best, focus position selected from among the second and subsequent frames.

Referring now to FIG. 3, when autofocusing is performed according to contemporary practice a first or original frame 300 is displayed when the autofocus mechanism has the lens assembly at a first or original position. Subsequently, a series of different autofocus (AF) positions 301-304, e.g., positions of the lens assembly, are tested to determine the position that provides the best focus. Although only four different autofocus position 301-304 are shown in FIG. 3, those skilled in the art will appreciate that in practice a much larger number of different autofocus positions are likely to be tested.

Once the best focus is determined, the position corresponding thereto is used, e.g., position 302. That is, in this example position 302 is the position of the focusing lens assembly where the best focus of all of the positions 301-303 is obtained.

According to contemporary practice, images corresponding to all of the positions 300-304 are displayed. Thus, a user sees a series of changing unfocused images, as well as the final focused image. Generally, most of the different autofocus position 301-304 will be out of focus. Typically, only one of the different autofocus positions 301-303 is in focus and that autofocus position is selected by autofocus circuit to the final or best position 302.

Displaying all of the images, including the series of changing unfocused images, can be annoying and distracting. Generally, it is preferably that the number of unfocused images that are displayed be minimized.

Figure 4:
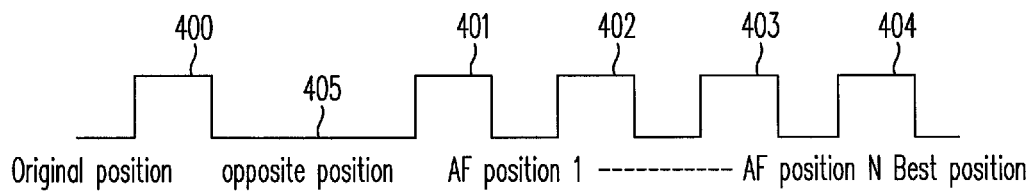
FIG. 4 is a diagram showing a series of frames that are displayed according to an exemplary embodiment of the present invention, wherein the autofocus system moves the focusing element, e.g. lens or lens assembly, from the original position to a distant, e.g., opposite, position thereof without displaying any frames and then begins to display frames at different autofocus positions until a frame at a final, e.g., best, focus position is displayed, so as to facilitate a plurality of searches at different starting points in a manner that mitigates the likelihood of missing optimal focus due to local optimum, for example.

Referring now to FIG. 4, a method for avoiding non-optimal focus due to the presence of local optima is shown. In attempting to determine the best focus, it is possible for an autofocus mechanism to be fooled by a local optimum. That is, the autofocus mechanism can find a focus position where movement of the lens assembly to either side of this focus position results in reduced sharpness. This is known as a local optimum. The focus mechanism may assume that this local optimum is the best focus position when another focus position exists that will provide better sharpness. This situation may be avoided by initially moving the lens assembly in steps that are large enough to move outside of the range of such local optima and thereby identify other candidates for areas where best focus may be found. Then, each candidate area can be checked for best focus and the best focuses from each candidate area can be compared to one another to determine the true best focus.

Indeed, any time that a potential best focus has been determined, the autofocus mechanism can test lens assembly positions that are far enough removed from the potential best focus so as to avoid being trapped with a local optima. In this manner, an even better focus than would otherwise have been overlooked may be found.

More particularly, according to an exemplary embodiment of the present invention the display of images is suppressed when the optical element, e.g., lens assembly 101, is moved from one position, e.g., original position 400, to a distant position, e.g., the opposite position 405. Such movement can be one of a series of comparatively large steps that are used in an attempt to avoid the undesirable effects of local optima. For example, the original position 400 can be at one extreme of travel, e.g., closest to imager 103, for the lens assembly 101 and the opposite position 405 can be at the other extreme of travel, e.g., farthest from imager 103. As a further example, the original position can be at one extreme of travel and the other position 405 can be one forth of the distance to the opposite extreme of travel. A pulse 400 is shown at the original position because the frame for this position is displayed. No pulse for position 405 is shown because display is suppressed while lens assembly 101 moves to and is at the opposite position. In this manner, the undesirable display of a series of unfocused images is avoided.

As those skilled in the art will appreciate, when the lens assembly is moved a large distance, such as from one extreme position to the other, then out of focus images are displayed according to contemporary practice. However, according to an exemplary embodiment of the present invention, these out of focus images are not displayed. Optionally, the images corresponding to autofocus positions 401-403 can also be suppressed. Alternatively, the images corresponding to autofocus positions 401-404 can be displayed. Positions 401-403 are positions of lens assembly 101 where autofocus mechanism is hunting for best focus.

During the change from original position 400 to opposite position 405, the image associated with the original position can be repeatedly displayed. However, repeatedly displaying the same image and then later displaying a new image (such as at position 404) can result in a discontinuity or abrupt change of the image that is objectionable. Displaying no image at all during this time can also be objectionable. The exemplary embodiment of the present invention discussed with reference to FIG. 5 below tends to mitigate this problem.

Figure 5:
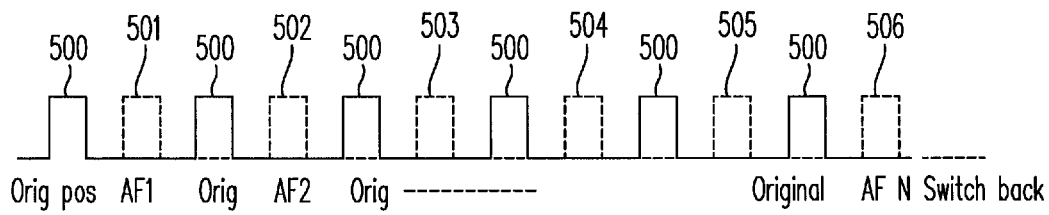
FIG. 5 is a diagram showing a series of frames that are displayed according to an exemplary embodiment of the present invention, wherein the autofocus mechanism repeatedly alternates the focusing element between an original position and a plurality of other positions until a frame at a final, e.g., best focus position is provided and displayed.

Referring now to FIG. 5, according to an exemplary embodiment of the present invention the display of unfocused images having undesirably changing focus is suppressed when the optical element, e.g., lens assembly 101, is moved during the autofocusing process. Moving the optical from one position to another position generally involves testing a plurality of positions so as to determine the best focus (the desired focus for the other position). The unfocused images from these test positions are not displayed. Rather, the second scene is displayed using the focus of the first scene while autofocus mechanism 100 is attempting to determine the best focus for the second scene. This can be accomplished by rapidly moving lens assembly 101 back and forth between the original position (the best focus for the first scene) and a plurality of other positions (where focus for the second scene is being tested or determined). Thus, not all images are provided to the display, but all images can be provided to the autofocus circuit 105.

The focus for the first scene may not be appropriate for the second scene (may not be the best focus therefor). But, at least the second scene is displayed using a single focus throughout the autofocus process (at least until a best focus for the second scene is determined). Displaying the second scene with a single focus throughout the autofocus process is substantially less annoying and distracting that displaying the second scene with a plurality (often many) different focuses, as is done according to contemporary practice.

The properly focused image using the original focus position 500 is displayed for the first scene. Then, after the scene changes (the camera is pointed in another direction, for example) this same focus (corresponding to original position 500) is displayed for the second scene until the best focus for the second scene is determined. Then, the best focus for the second scene is displayed. Thus, only one non-best focus is displayed for the second scene. This is a substantial improvement over contemporary practice wherein a much larger number of non-best focuses are displayed for the second scene.

Even though unfocused images are suppressed, an image is constantly displayed. The constantly displayed image is a real-time image of the scene with the focus being that of the original position. Lens assembly 101 can be moved fast enough so that it returns to the original position quickly enough and often enough for real time display of the second scene with the original focus. The focus provided by lens assembly 101 at the original position may not be the best focus, but at least it is not changing in a manner that is annoying or distracting.

More particularly, when the optical element needs to move from an original position 500 to a new position due to a change in the distance to the scene being imaged, for example, then every other frame 500 is displayed with the original focus and the alternating frames (the frames shown in dashed lines that are between the ones that are imaged with the original focus 500) are the frames being tested 501-506 by the autofocus mechanism. The frames being tested 501-506 by the autofocus mechanism are generally out of focus and not displayed (at least until a best focused one of these frames has been identified).

The frames being tested 501-506 are at a series of different focus positions such that the autofocus mechanism can select the best focus position from among the different tested focus positions. For example, lens assembly 101 can be stepped in a series of equally spaced increments (each increment being one tenth of the total travel of lens assembly 101), so as to find a best focus position among these ten potential focus positions. This process can be repeated about the best focus position by stepping lens assembly 101 in smaller steps through a series of potential focus positions that are clustered proximate the previously found best focus position to find an even better, e.g., a new best, focus position.

This process can be iterated until a sufficiently focused image is provided. That is, a better focus position proximate a previously determined best focus position can be looked for until the focus is determined to be adequate or until no better focus position is found. The best focus position is that focus position that is determined to provide the best focus, using any desired criteria.

Figure 6:
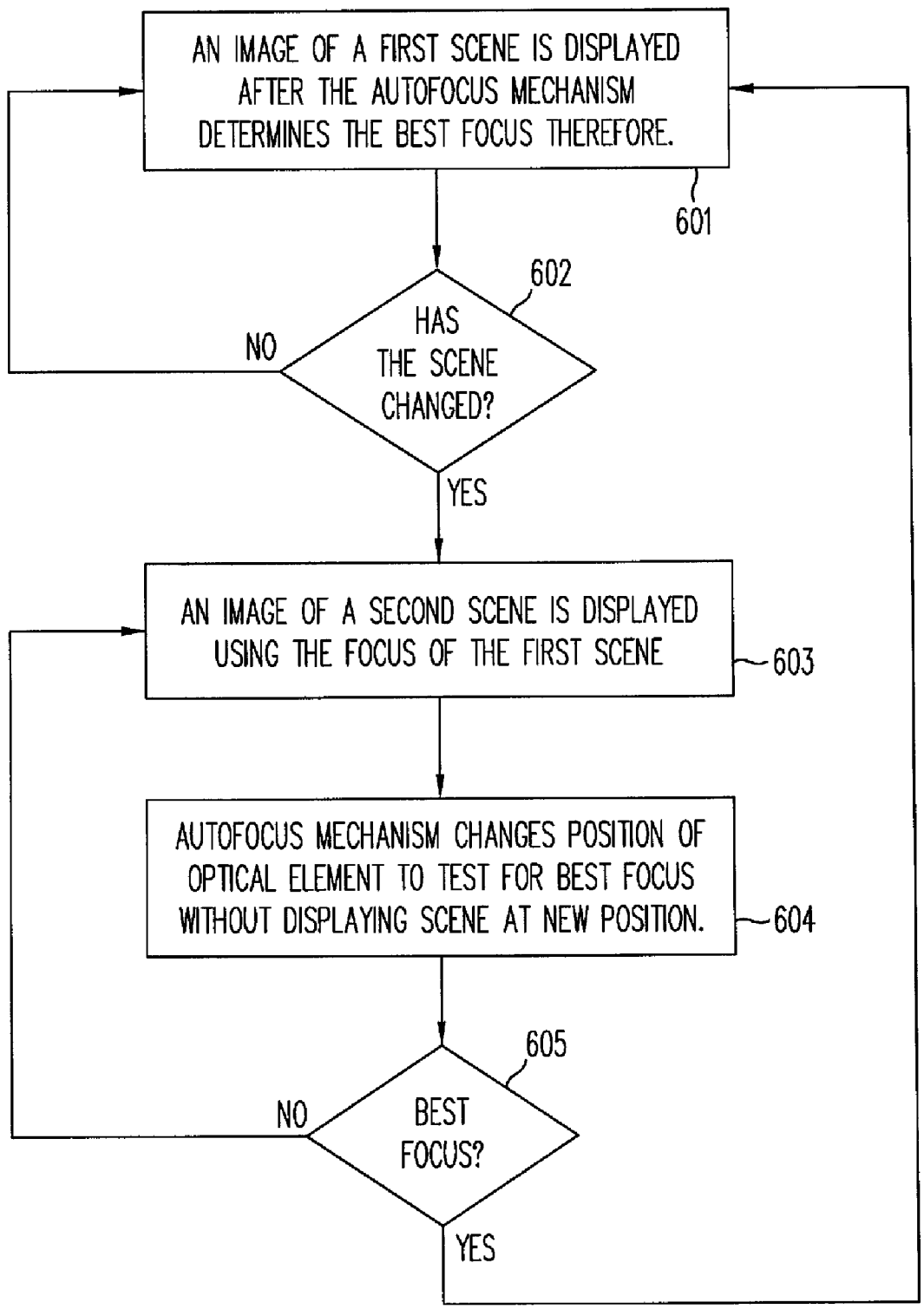
FIG. 6 is a flow chart showing the operation of an exemplary embodiment of the present invention (such as the embodiment shown in FIG. 1), wherein a first scene is displayed until the scene changes, e.g., the user aims the camera at a different scene, the autofocus mechanism alternates positioning of the focusing element between the focus for the first scene and a series of test focuses without displaying any of the test focuses until a best second focus is determine.

Referring now to FIG. 6, the operation of an exemplary embodiment of the present invention (such as the embodiment shown in FIG. 1) is depicted in a flow chart. The flow chart commences with an image being displayed after the autofocus mechanism has determined the best focus (based upon any desired criteria and using any desired method), as indicated in block 601.

Thus, a focused image is being displayed. Subsequently, a new focus is required as indicated in block 602. A new focus may be required because of a change in the distance between the camera and the subject. For example, the person using the camera may move, the subject may move, and/or the person using the camera may direct the camera toward a new subject.

A new image is displayed using the previous focus, as indicated in block 603. However, since a new focus may be required, the image being displayed may be out of focus at this time.

The autofocus mechanism 110 attempts to determine the best focus for the new image. To determine the best focus for the new image, the autofocus mechanism changes the position of an optical element, such as lens assembly 101, as described above. The autofocus mechanism 110 then tests the image produced by the new position of the optical element to determine if the best focus has been achieved. The image being tested is not displayed, as indicated in block 604.

After testing a plurality of positions for best focus, e.g., sharpness, a formula, algorithm, table, or other mathematical means can optionally be used by the autofocus mechanism to predict the lens assembly position that is likely to provide the best focus. Thus, the best focus position may not necessarily be one of the focus positions that was previously tested.

For example, a linear or other regression of sharpness versus lens assembly position can be used to determine the formula. Then, positions about this predicted position can be tested and, if necessary a new formula can be used to predict the best position. This process can be iterated until a focus that meets a predetermined criteria is found.

The process of displaying the new image using the focus of the previous image as indicated in block 603 and testing new positions of the optical element for best focus as indicated in block 604 is performed iteratively until a best focus for the new image is found, as indicated in block 605. The iteration of block 603 and 604 may occur many times as the autofocus mechanism 100 attempts to determine the best focus for the new image. This iterative process can be performed rapidly because the lens assembly 101 can be small and lightweight (such as a lens assembly for a miniature camera that is configured for use in a cellular telephone) and because the MEMS actuator is capable of rapid movement without substantial hysteresis. Because the iterative process can be performed rapidly and because the new image is displayed using the best focus for the previous image, the user may be unaware of this autofocusing process.

Once a best focus is found, then the process of displaying a scene using the best focus position for the image is repeated. That is, the new image becomes the image being displaying in block 601 and the autofocus mechanism 110 continues to display the properly focused image until a new focus is required as indicated in block 602.

The frame rate for the new image being displayed with the previous focus as indicated in block 603 can drop so as to facilitate the autofocus process. For example, the frame rate can drop from a normal frame rate of 30 frames per second that is used during display of the image indicated in block 601 (after the autofocus process) to a rate of 15 frames per second that is used to display the image during the autofocusing process as indicated in clock 604. Alternatively, the frame rate can remain unchanged during the autofocusing process.

Referring now to FIG. 7, camera 110 can be part of a personal electronic device 600 such as cellular telephone, PDA, pocket PC, notebook computer, or laptop computer. Alternatively, camera 110 can be a stand alone or dedicated camera. A widow 601 admits light into camera 110 for imaging. Window 601 can be a lens. Display 107 facilitates viewing of images, such as prior to taking a picture and after the picture has been taken (viewing the stored image).

Thus, according to one or more embodiments of the present invention, the display of unfocused images is substantially mitigated. More particularly, the annoyance and distraction associated with displaying a scene where the focus is rapidly changing is avoided. Thus, a digital autofocus camera that does not display the images associated with the process of determining the best focus is provided.

Because the autofocus process is at least partially hidden from the user, the autofocus process can be performed frequently or generally continuously instead of only immediately prior to capturing an image. This can be done without waiting for a change in sharpness. Thus, the autofocus mechanism can be generally continuously testing other focus positions so as to generally continuously provide the best one thereof. Since the positions where focusing is being tested are hidden from view by the user, the camera will generally appear to be in focus.

A camera manufacturer may impose a specification of a time duration during which the autofocusing process is to be completed. According to at least one embodiment of the present invention, this process appears to take no time because the autofocus process is generally hidden for a user. The appearance of taking no time may, in some instance, allow the camera to meet a more stringent manufacturer's specification for such a time duration.

The present invention is described herein as being applicable to focus. However, the present invention can be applied to other parameters of a camera. For example, the present invention can be applied to white balance, exposure time, and/or aperture. Any of these, as well as other, parameters can be alternated between an original value and other values while the camera is only displaying an image using the original value and while testing for best value of the parameter using the other values. As such, discussion herein of the invention as being applicable to focus is by way of example only, and not by way of limitation.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A method for focusing a camera, the method comprising:
repeatedly alternating a focus position of an optical element between an original focus position and a plurality of other focus positions while a new focus position is being determined;
displaying an image when the focus position of an optical element is the original focus position;
displaying no images at other focus positions which have not been determined to be a best focus position; and
displaying an image at one of the other focus positions which has best determined to be the best focus position.

2. The method as recited in claim 1, further comprising reducing a frame rate of the camera while the new focus position is being determined.

3. The method as recited in claim 1, further comprising using a formula to predict a next focus position to test for best focus.

4. The method as recited in claim 1, further comprising testing focus using a plurality of steps for moving the optical element a predetermined distance with respect to the imager to avoid a false determination of best focus due to a local optimum.

5. The method as recited in claim 1, wherein the original focus position is a best focus position for a previous scene.

6. The method as recited in claim 1, wherein the other focus positions are focus positions at which an autofocus mechanism is testing focus for best focus.

7. The method as recited in claim 1, wherein repeatedly alternating focus between an original focus position and a plurality of other focus positions comprises repeatedly focusing at the original focus position for one frame and focusing at one of the other focus positions for one frame, the other focus positions being different from one another.

8. The method as recited in claim 1, wherein repeatedly alternating focus between an original focus position and a plurality of other focus positions comprises moving at least one lens.

9. The method as recited in claim 1, wherein repeatedly alternating focus between an original focus position and a plurality of other focus positions comprises using a mechanism with substantially no hysteresis to effect focusing.

10. The method as recited in claim 1, wherein repeatedly alternating focus between an original focus position and a plurality of other focus positions comprises using a microelectromechanical system (MEMS) mechanism to effect focusing.

11. The method as recited in claim 1, wherein displaying an image comprises displaying the image on a display of the camera.

12. The method as recited in claim 1, wherein focus is determined by a passive focusing mechanism.

13. The method as recited in claim 1, further comprising analyzing an image from an imaging sensor to determine whether the image is in focus.

14. An autofocus mechanism for a camera, the autofocus mechanism comprising:
an imager;
an optical element for focusing an image upon the imager;
an actuator for moving the optical element;
a position controller for controlling movement of the actuator;
an autofocus circuit for determining when an image is in focus;
a display device for displaying an in focus image;
wherein the imager, the optical element, the actuator, the position controller, and the autofocus circuit cooperate to repeatedly alternate focus between an original position and a plurality of other positions;
wherein the autofocus circuit facilitates displaying an image on the display device when the optical element is at the original position;
wherein the autofocus circuit facilitates not displaying an image on the display device when the optical element is at other positions and the image is out of focus; and
wherein the autofocus circuit facilitates displaying an image on the display device when the optical element is in a new position and the image is in focus.

15. The autofocus mechanism as recited in claim 14, wherein the optical element comprises at least one lens.

16. The autofocus mechanism as recited in claim 14, wherein the actuator comprises a MEMS actuator.

17. The autofocus mechanism as recited in claim 14, wherein the autofocus circuit provides a display enable signal to facilitate displaying an image.

18. The autofocus mechanism as recited in claim 14, wherein the autofocus circuit comprises a general purpose computer.

19. The autofocus mechanism as recited in claim 14, wherein the autofocus circuit comprises a digital signal processor.

20. The autofocus circuit as recited in claim 14, wherein the imager, the optical element, the actuator, the position controller, and the autofocus circuit are configured to be used in a personal electronic device.

21. The autofocus circuit as recited in claim 14, wherein the imager, the optical element, the actuator, the position controller, and the autofocus circuit are configured to be used in a cellular telephone.

22. A method for varying a parameter of a camera, the method comprising:

repeatedly alternating the parameter between an original value and a plurality of other values while a new value for the parameter is to being determined;

displaying an image when the parameter has the original value;

displaying no images when the parameter has other values which have not been determined to be a best value; and displaying an image when the parameter has a value which has best determined to be the best value.

23. The method as recited in claim 22, wherein the parameter is selected from the list comprising:

focus;

white balance;

exposure time; and aperture.

\* \* \* \* \*